United States Patent
Zaloga et al.

(10) Patent No.: US 7,914,023 B2
(45) Date of Patent: Mar. 29, 2011

(54) PARALLELOGRAM-STYLE STEERING MECHANISM HAVING A RELAY ROD BUSHING

(75) Inventors: Miroslaw Zaloga, Shelby Township, MI (US); Christopher J. Mielke, Shelby Township, MI (US); George E. Doerr, Clarkston, MI (US); Christopher N. Bither, Commerce Township, MI (US); Marco E. Rodriguez, Macomb Township, MI (US); Eric B. Hoyer, White Lake, MI (US)

(73) Assignee: GM Global Technology Operations LLC, Detroit, MI (US)

(*) Notice: Subject to any disclaimer, the term of this patent is extended or adjusted under 35 U.S.C. 154(b) by 117 days.

(21) Appl. No.: 12/403,609

(22) Filed: Mar. 13, 2009

(65) Prior Publication Data

US 2010/0230921 A1 Sep. 16, 2010

(51) Int. Cl.
*B62D 7/16* (2006.01)
*F16C 27/06* (2006.01)
*F16F 1/38* (2006.01)

(52) U.S. Cl. ............ 280/93.511; 280/93.509; 74/579 F; 384/220; 403/147; 403/228; 267/140.12; 267/141.7

(58) Field of Classification Search ............. 280/93.511, 280/93.51, 93.509, 93.508, FOR. 109; 180/6.4; 74/579 F; 384/215, 220, 222; 403/120, 145, 403/147, 133, 135, 369, 225, 228; 267/281, 140.12, 141, 141.1, 141.2, 141.3, 141.4, 141.5, 141.6, 141.7; B62D 7/16
See application file for complete search history.

(56) References Cited

U.S. PATENT DOCUMENTS

| | | | | | |
|---|---|---|---|---|---|
| 3,347,576 | A | * | 10/1967 | Templeton | 403/161 |
| 3,945,737 | A | * | 3/1976 | Herbenar | 403/27 |
| 5,765,844 | A | * | 6/1998 | Wood | 280/93.509 |
| 6,109,630 | A | * | 8/2000 | Dazy et al. | 280/124.11 |
| 6,729,611 | B2 | * | 5/2004 | Deschaume et al. | 267/140.12 |
| 7,306,209 | B2 | * | 12/2007 | Vossel et al. | 267/140.13 |

* cited by examiner

*Primary Examiner* — Toan C To
*Assistant Examiner* — Keith Frisby
(74) *Attorney, Agent, or Firm* — Quinn Law Group, PLLC

(57) ABSTRACT

A steering mechanism includes a relay rod and an idler arm operatively attached to a first end thereof. A pitman arm includes a stud and is operatively attached to a second end of the relay rod. A bushing is configured to allow displacement of the pitman arm relative to the relay rod. The bushing includes an outer can, an inner metal member, and a bushing disposed therebetween. The inner metal member has a tapered receptacle configured to mate with a tapered portion of the stud. The resilient member may include voids, which may be oriented generally perpendicular to a turning direction and may be tapered from the base to the opening. The inner metal member may have a generally-cylindrical portion and substantially-opposing outer flats interrupting the same. The outer flats are spaced by a distance smaller than the cylinder diameter and may be substantially parallel to the turning direction.

20 Claims, 5 Drawing Sheets

PARALLELOGRAM-STYLE STEERING MECHANISM HAVING A RELAY ROD BUSHING

TECHNICAL FIELD

This disclosure relates to parallelogram-style steering linkages.

BACKGROUND OF THE INVENTION

Steering systems utilize revolute joints and parallelogram-style linkages to convert the rotational motion of the steering wheel into the linear motion needed to turn the wheels. In the case of recirculating ball steering systems, rotation of a pitman arm is converted into generally-linear movement of a track rod or relay rod. The relay rod is coupled through linkages to turn the wheels and therefore turn the vehicle.

The steering system plays a role in total vehicle handling. Under steer, steering effort, steering sensitivity, and other performance characteristics are affected by the geometry and compliance of the steering system and its components. Parallelogram-style steering systems are generally built from rigid components.

SUMMARY

A parallelogram-style steering mechanism is provided. The steering mechanism includes a relay rod and an idler arm operatively attached to a first end of the relay rod. A pitman arm having a joint and a stud is operatively attached to a second end of the relay rod. The second and first ends of the relay rod are substantially opposite each other. The second end includes a bushing configured to allow controlled displacement of the pitman arm relative to the relay rod.

The bushing further includes an outer can and an inner metal member. The inner metal member has a tapered receptacle configured to mate with a corresponding tapered portion of the stud. A resilient member is disposed substantially between the outer can and the inner metal member. The resilient member, outer can, and inner metal member are substantially co-axial about the stud.

The resilient member may include a plurality of voids or gaps. The voids may be oriented generally perpendicular to a turning direction, which is generally parallel to the relay rod. Each of the plurality of voids may be sized to span a width of between approximately 1 mm to 2 mm. Furthermore, the plurality of voids may be tapered, such that the opening of the voids is larger than the base of the voids. The resilient member may have a shear thickness of approximately 10-15% of the outer diameter of the resilient member.

The inner metal member may further include a first generally-cylindrical portion and substantially-opposing first and second outer flats interrupting the first generally-cylindrical portion. The first and second outer flats are spaced by a lower-flat distance which is smaller than the diameter of the first generally-cylindrical portion. The first and second outer flats may be substantially parallel to the turning direction. The lower-flat distance of the inner metal member may be less than approximately 95% of the diameter of the first generally-cylindrical portion.

The relay rod may be constructed from multiple components, such that the relay rod further includes an idler component on the first end of the relay rod and a bushing component on the second end of the relay rod. A hollow shaft component connects the idler component and the bushing component.

The inner metal member may also include a second generally-cylindrical portion and substantially-opposing third and fourth outer flats interrupting the second generally-cylindrical portion. The third and fourth outer flats are spaced by an upper-flat distance smaller than the diameter of the second generally-cylindrical portion.

The above features and advantages and other features and advantages of the present invention are readily apparent from the following detailed description of the best modes and other embodiments for carrying out the invention when taken in connection with the accompanying drawings.

DESCRIPTION OF PREFERRED EMBODIMENTS

Figure 1:
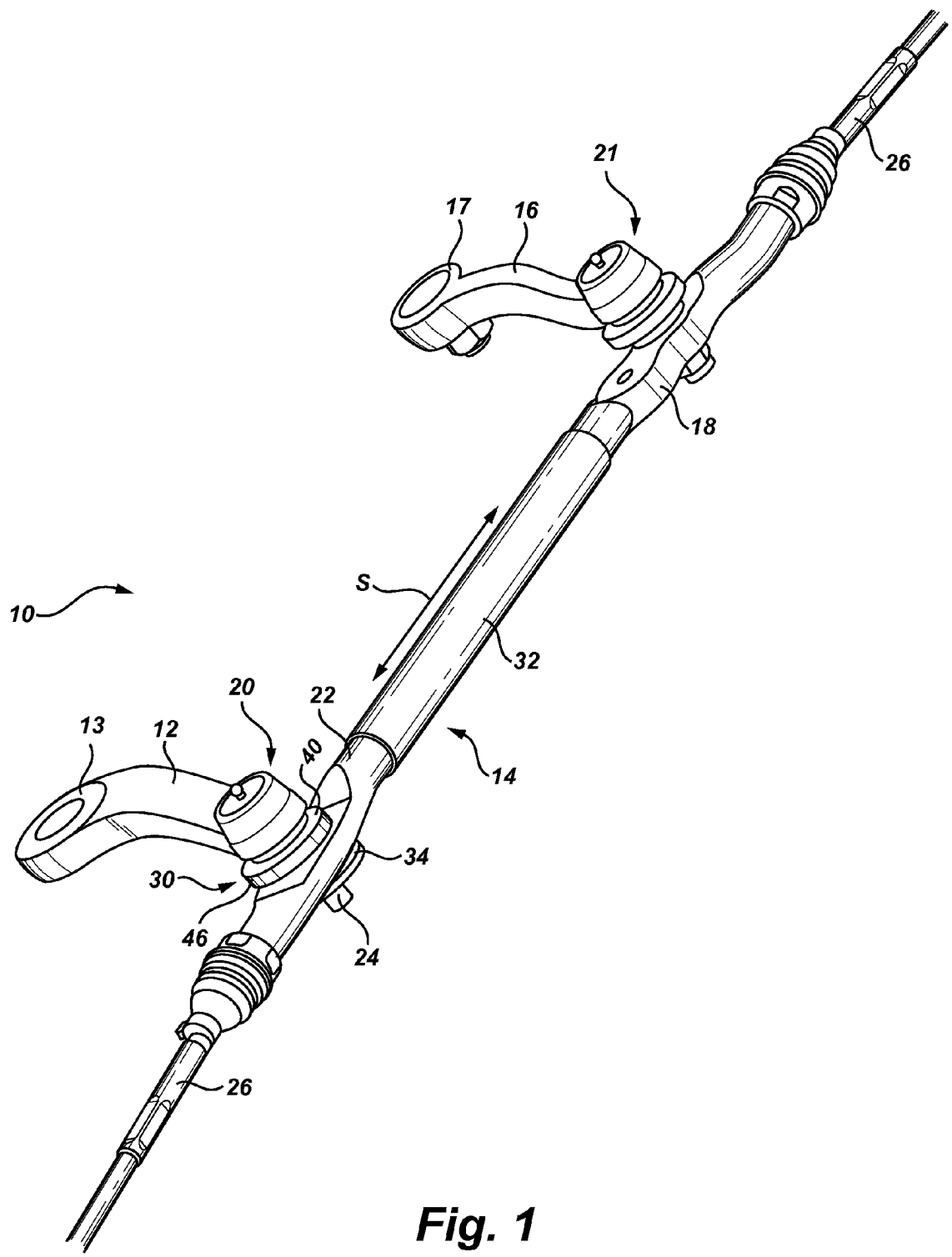
FIG. 1 is a schematic, isometric view of a parallelogram-style steering mechanism having a relay rod bushing and a multi-piece relay rod.

Referring to the drawings, wherein like reference numbers correspond to like or similar components throughout the several figures, there is shown in FIG. 1 a parallelogram-style steering mechanism 10, which may be included in a recirculating ball steering system. The steering mechanism 10 includes a pitman arm 12, a relay rod 14, and an idler arm 16. As pitman arm 12 is rotated about the pivot end 13 by a sector gear (not shown) linked to the steering column (not shown), rotation of the pitman arm 12 is transferred to the relay rod 14.

Steering mechanism 10 causes rotation of the pitman arm 12 and moves the relay rod 14 in a generally lateral direction. This direction may be referred to as the turning direction, and is shown schematically in FIG. 1 as arrow S. The pitman arm 12 and idler arm 16 are configured to pivot about respective pivot ends 13 and 17, which are coupled to the vehicle chassis (not shown), thus forming a parallelogram structure. The lengths of pitman arm 12, relay rod 14, and idler arm 16 form the links of the parallelogram. Depending upon the exact geometry of steering mechanism 10, the turning direction may be generally parallel to relay rod 14. The turning direction is always defined by the initial direction of movement when the vehicle changes from a straight line, to a slight turn of the vehicle. Turning direction S is tangential to the path of the pitman arm 12 as it rotates away from the straight line trajectory.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The idler arm 16 is operatively attached to a first end 18 of the relay rod 14. Pitman arm 12 includes a pivot joint assembly 20 which is operatively attached to a second end 22 of the relay rod 14. Idler arm 16 includes an idler pivot joint 21; such that the pivot ends 13 and 17, the pivot joint assembly 20, and the idler pivot joint 21 form the four points of the parallelogram. As shown in FIG. 1, the second end 22 is generally opposite the first end 18 of the relay rod 14.

A stud 24 (mostly blocked from view FIG. 1, shown in FIG. 5), links the pivot joint assembly 20 and the relay rod 14. Tie rods 26 are coupled to the steerable wheels of the vehicle and transfer turning motion of the steering mechanism 10 to turn the vehicle.

The stud 24 is connected to relay rod 14 through a bushing assembly 30 (which may be referred to as simply bushing 30), which is disposed in the second end 22 of relay rod 14. Stud 24 generally defines an axis, about which the pivot joint assembly 20 may rotate as the rotation of pitman arm 12 is translated into radial movement of the stud 24 relative to the second end 22, which is translated into lateral, linear movement of the relay rod 14 in the turning direction S.

Note that radial movement of the stud 24 relative to the second end 22 may be in the turning direction (shown as arrow S) or any other displacement generally perpendicular to the axis of stud 24. In addition to radial movement of stud 24, further degrees of freedom of relative movement between the stud 24 and the second end 22 are: axial, which occurs along the axis of stud 24; rotation, revolution or pivoting about stud 24; and angulation, which occurs if the second end 22 rocks or wobbles stud 24.

In the embodiment shown in FIG. 1, the relay rod 14 is constructed from multiple components or pieces. An idler component is located at the first end 18 of the relay rod 14, and a bushing component is located at the second end 22 of the relay rod 14. In this embodiment, the first and second ends 18 and 22 may be formed or manufactured separately, such as by forging. A hollow shaft component 32 connects the idler component and the bushing component.

Figure 2:
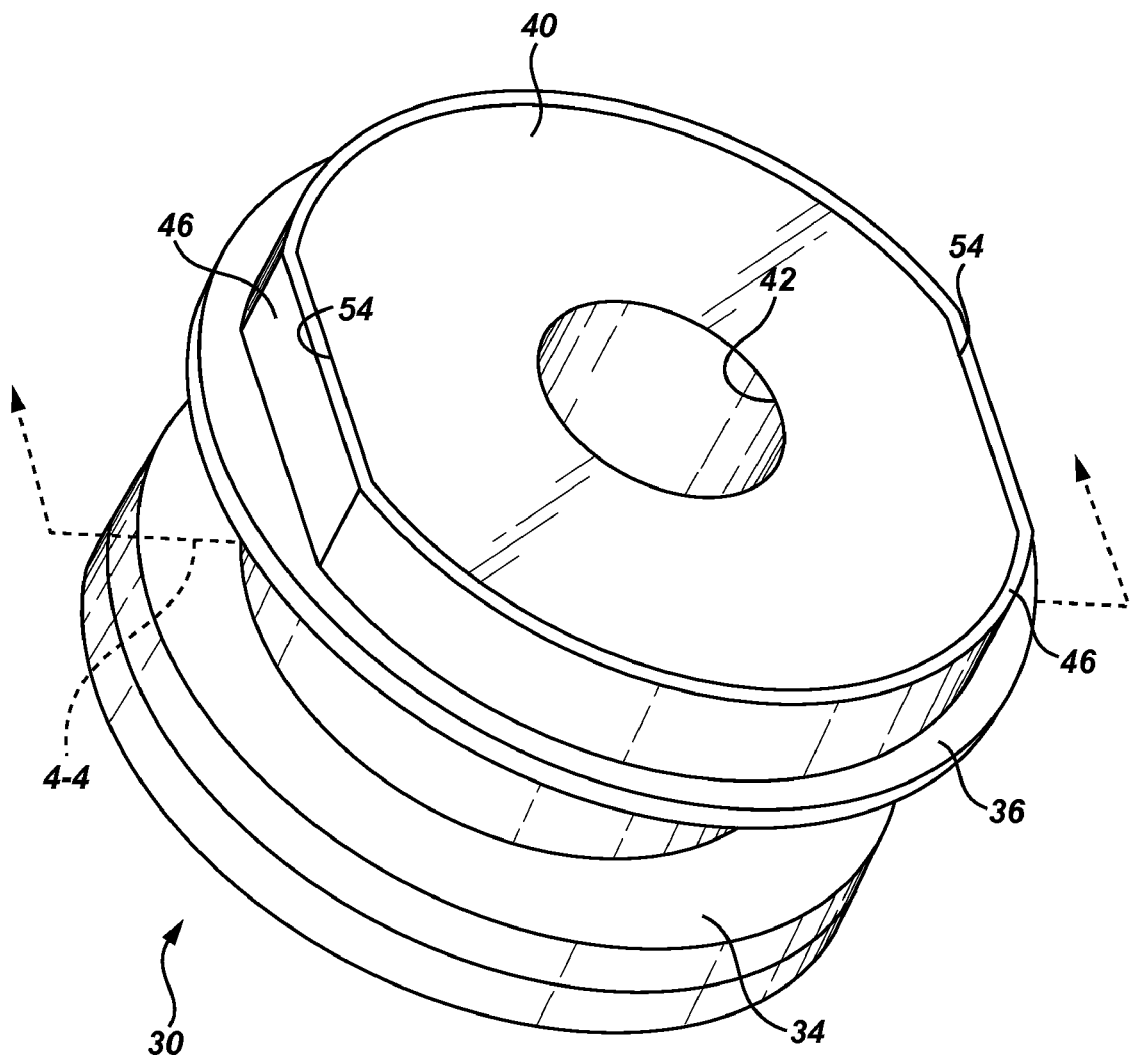
FIG. 2 is a schematic, isometric view of the relay rod bushing assembly shown in FIG. 1.
Figure 3:
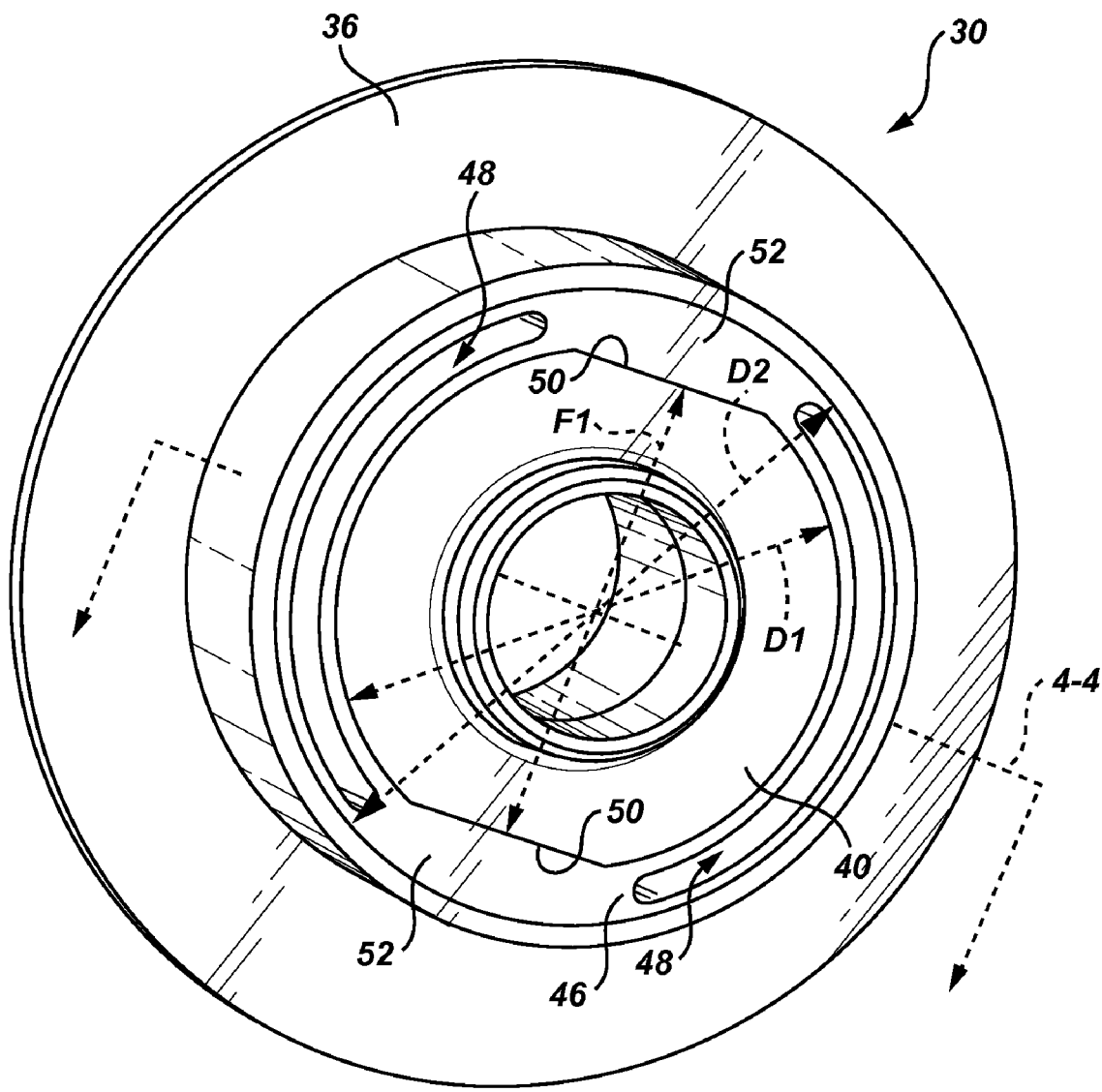
FIG. 3 is a schematic, isometric view of the relay rod bushing assembly shown in FIG. 2, shown from below and without the retainer.

Referring now to FIGS. 2 and 3, and with continued reference to FIG. 1, there are shown two isometric views of the relay rod bushing assembly 30. FIG. 2 shows the bushing assembly 30 from a top view, similar to the viewing angle shown in FIG. 1, and includes a retainer 34 (which is partially viewable in FIG. 1). FIG. 3 shows the bushing assembly 30 from a bottom view, with the retainer 34 removed.

Bushing assembly 30 includes an outer metal member or outer can 36, which supports the bushing assembly 30 against the second end 22. Outer can 36 cooperates with retainer 34 and a nut (not shown in FIG. 2 or 3, shown in FIG. 5) to hold the bushing assembly 30 to the relay rod 14.

Figure 5:
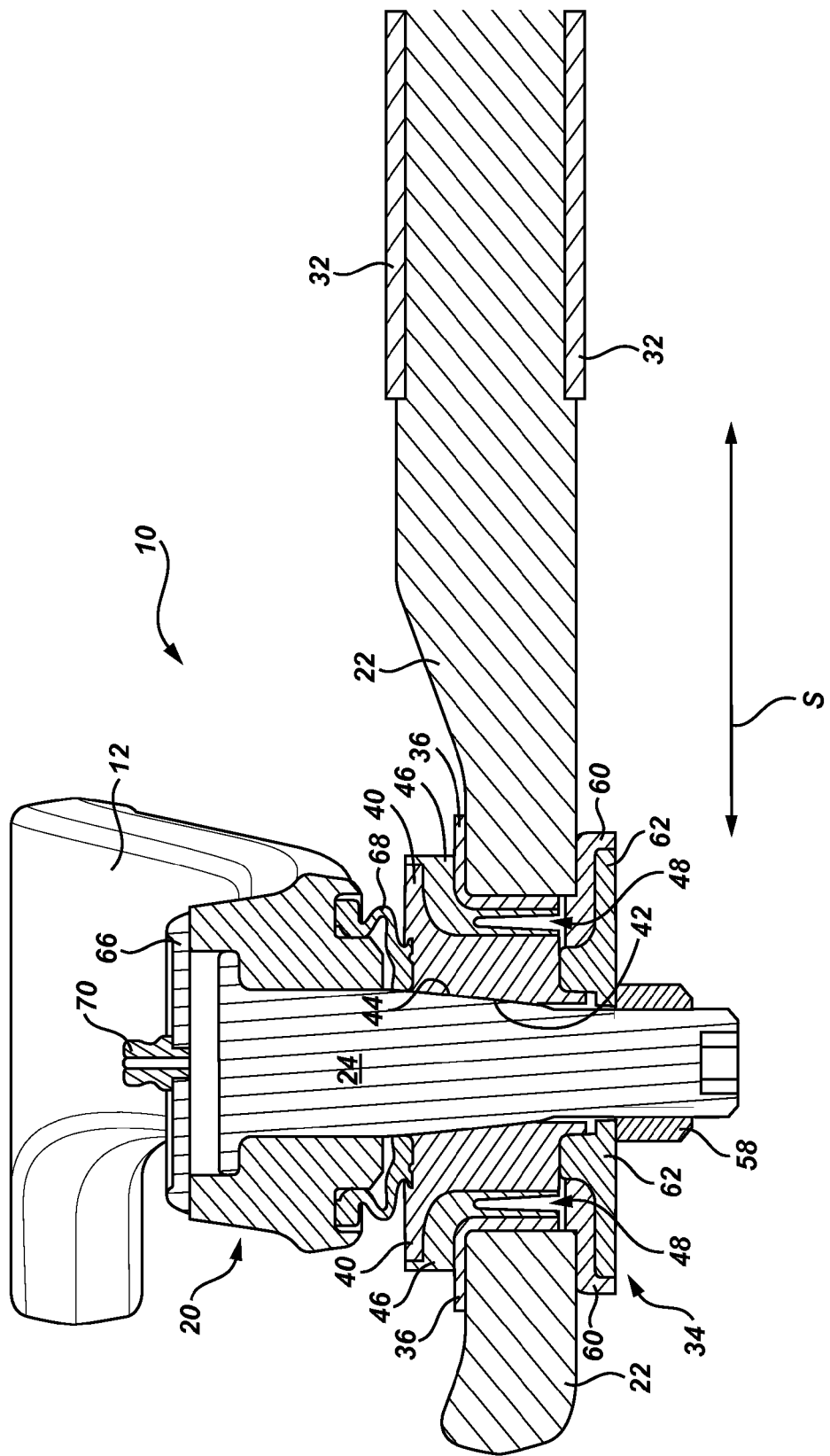
FIG. 5 is a schematic, partial cross-sectional view of the parallelogram-style steering mechanism shown in FIG. 1, showing the relay rod bushing, stud, pitman arm joint, and hollow portion of the multi-piece relay rod.

An inner metal member 40 supports the bushing assembly 30 against the stud 24. A tapered receptacle 42 is configured to mate with a corresponding tapered portion 44 (as shown in FIG. 5) of stud 24. The tapered receptacle 42 and tapered portion 44 have a generally frusto-conical shape.

A resilient member 46 is disposed substantially between the outer can 36 and the inner metal member 40. Note that the resilient member 46, outer can 36, and inner metal member 40 are all substantially co-axial about the stud 24. Resilient member 46 may be formed from a rubber compound or other material known to those having ordinary skill in the art as having suitable compliance for use in the bushing assembly 30.

Resilient member 46 is configured to allow controlled displacement between the outer can 36 and inner metal member 40, and can be tuned to change the force required to cause relative displacement. Because the outer can 36 is secured to the second end 22 of relay rod 14 and the inner metal member 40 is secured to stud 24 of the pivot joint assembly 20, resilient member 46 therefore controls relative displacement between the relay rod 14 and pivot joint assembly 20.

Figure 4:
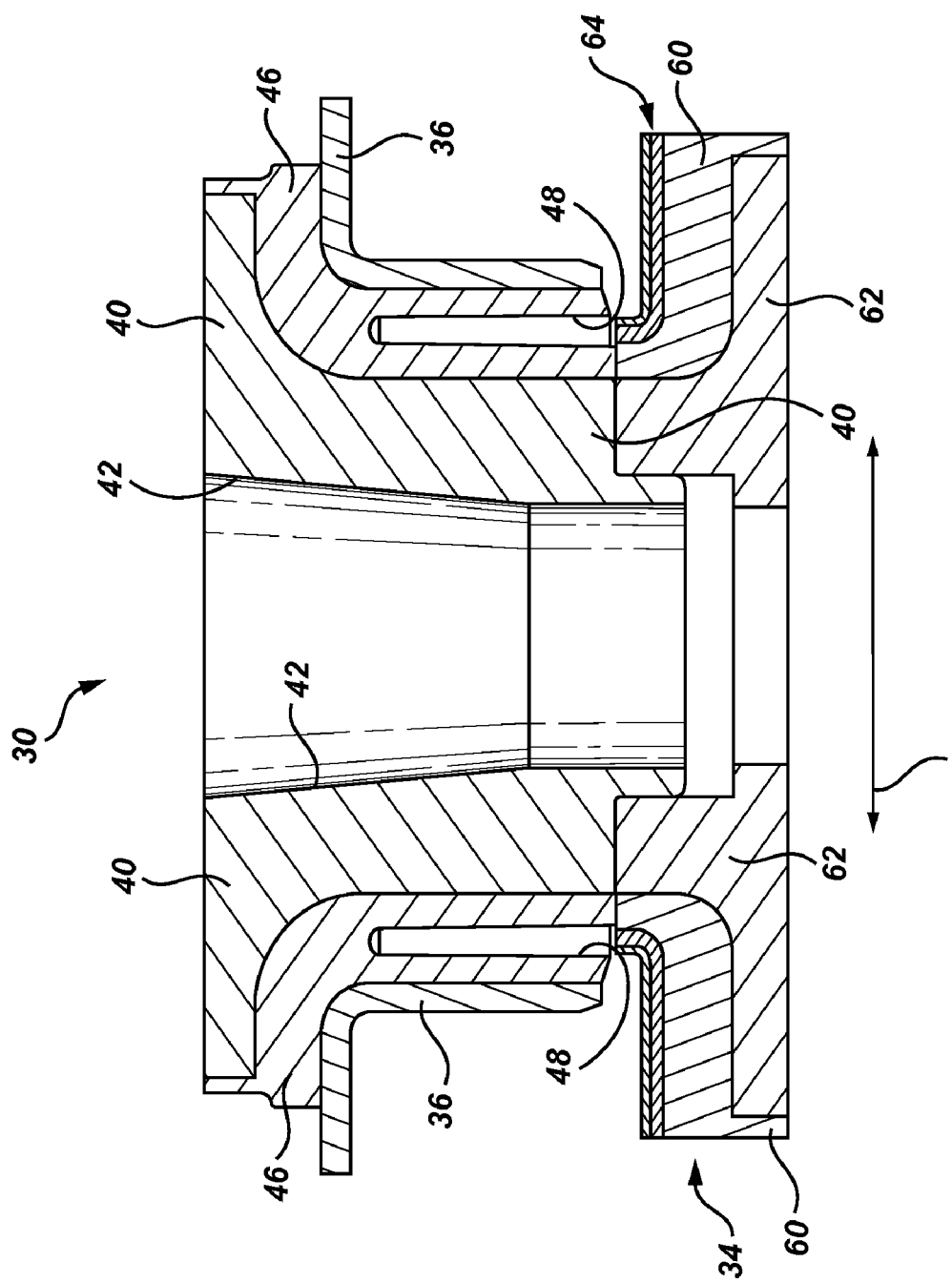
FIG. 4 is a schematic, cross-sectional view of the relay rod bushing assembly shown in FIG. 2 taken along plane 4-4.

Referring now to FIG. 4, and with continued reference to FIGS. 1-3, there is shown a cross-sectional view of the bushing assembly 30 taken along plane 4-4 of FIG. 2. Note that plane 4-4 is also shown in FIG. 3.

In operation of the steering mechanism 10, rotation of the pitman arm 12 causes the stud 24 to move in the turning direction, again shown as arrow S in FIG. 4. Displacement of the stud 24 causes the inner metal member 40 to move in the turning direction S, compressing the resilient member 46. Depending upon the amount of compliance, or stiffness, in the resilient member 46, the outer can 36 and relay rod 14 will be displaced at a slightly different rate.

In the embodiment shown in FIGS. 3 and 4, the resilient member 46 includes a plurality of voids 48. Because the voids 48 represent an area having less rubber, the stiffness of the resilient member 46 will be reduced when displacement occurs in the direction of the voids 48. Similarly, the resilient member 46 has greater stiffness when displacement occurs in a direction lacking voids 48 (e.g. a solid portion of resilient member 46).

In the embodiment shown, there are two voids 48, located or oriented generally perpendicularly to the turning direction S. When the vehicle begins turning, the inner metal member 40 displaces in the turning direction S and causes one of the voids 48 to shrink, and eventually close.

The bushing assembly 30 shown in FIGS. 3 and 4 exhibits reduced stiffness against displacement in the turning direction S, as compared to displacement perpendicular to the turning direction S. However, when one of the voids 48 closes, e.g., the displacement exceeds the width of the closing void 48, the stiffness rate will increase as the surrounding rubber must compress in order to allow further displacement. Resilient member 46 therefore acts as a progressive-rate bushing for displacement in the turning direction, increasing the stiffness as the displacement increases.

To further alter the response of resilient member 46, the voids 48 are tapered, such that an opening of the voids 48 has greater width than a base of the voids 48. For example, the voids 48 may have an opening or lower width (as viewed in FIG. 4) of approximately 2 millimeters (mm) and a base or upper width (as viewed in FIG. 4) of approximately 1 mm.

Tapered voids 48 may cause the stiffness rate to increase as lateral displacement closes the base width and a second time as the displacement closes the opening width or span. For illustration only, the stiffness rates of resilient member 46 having the tapered voids 48 may be: 2000 Newtons per millimeter (N/mm) from 0 to 1 mm of displacement; 3750 N/mm from 1 mm to 2 mm of displacement; and exponentially-increasing stiffness for greater than 2 mm of displacement.

As best viewed in FIG. 3, the inner metal member 40 further includes substantially-opposing first and second outer flats 50, which are located on a lower or first generally-cylindrical portion inner metal member 40. In this context, "lower" refers, generally, to the direction of the ground relative to the vehicle, which is down and to the right in FIG. 1 and toward the bottom of FIGS. 4 and 5. These first and second flats 50 interrupt the generally-cylindrical shape of the inner metal member 40 to form an oblong shape.

The first and second outer flats 50 are spaced by a lower-flat distance F1 smaller than the diameter D1 of the lower generally-cylindrical portion. Resilient member 46 is therefore configured to fill the extra space created by the first and second flats 50.

Furthermore, the bushing assembly 30 may be oriented such that the first and second outer flats 50 are substantially parallel to the turning direction S. Therefore, the rubber adjacent first and second outer flats 50 is placed in shear loading when the vehicle turns, and these areas of resilient member 46 may be referred to as shear zones 52. The thickness of the shear zones 52—shown as the difference between the lower-flat distance F1 and a diameter D2 of resilient member—is therefore greater than it would be if the first generally-cylindrical portion were a perfect cylinder.

For illustration only, the inner metal member 40 and resilient member 46 may be sized as follows: outer flat distance F1 of approximately 35 mm; diameter D1 of approximately 38 mm; and diameter D2 of approximately 47 mm. Therefore, the thickness of shear zones 52 may be approximately 6 mm. The sizes of the bushing assembly 30 shown in FIGS. 2-3 may also be expressed as ratios. For exemplary purposes only: the lower-flat distance F1 may be less than approximately 95% of diameter D1 of the first generally-cylindrical portion. The thickness of shear zones 52 may be approximately 10-15% of the outer diameter D2 of the resilient member 30.

Manipulation of the size, taper and location of the voids 48 alters the compliance of the bushing assembly 30. The compliance is tunable to affect the radial, axial, and angulation movements. Furthermore, the compliance of bushing assembly 30 is affected by the size, location, and orientation of the first and second outer flats 50. The combined effects of these components, along with the varying thickness of rubber in the resilient member 46 between the inner metal member 40 and outer can 36, allow the bushing assembly to be very tunable and greatly adjust the operation of the steering assembly 10 and overall handling characteristics of the vehicle.

As best viewed in FIGS. 2 and 4, the inner metal member further includes substantially-opposing third and fourth outer flats 54, which are located on an upper (as viewed in FIG. 4) or second generally-cylindrical portion of inner metal member 40. These third and fourth flats 54 interrupt the generally-cylindrical shape of the inner metal member 40 to form another oblong shape and are spaced by an upper-flat distance smaller than the outer diameter of the second generally-cylindrical portion. The third and fourth flats 54 may be configured as location features for assembly or manufacture of the bushing assembly 30 and steering mechanism 10.

Referring now to FIG. 5, and with continued reference to FIGS. 1-4, there is shown a partial cross-sectional view of the parallelogram-style steering mechanism 10 shown in FIG. 1. FIG. 5 shows the bushing assembly 30 attached to the second end 22 of relay rod 14. Stud 24 holds the pivot joint assembly 20 and inner metal member 40 to the second end 22 via the retainer 34 and a nut 58. FIG. 5 further shows the cross-sectional view of the hollow portion 32 of relay rod 14.

As shown in FIGS. 4 and 5, the retainer ring 34 may be formed of multiple components. A rubber retainer member 60 may reduce vibration, and may cooperate with resilient member 46 to seal bushing assembly 30 against the passage of foreign material, moisture, or lubricant. A metal retainer member 62 is clamped against the inner metal member 40 by the force of the nut 58. The retainer 34 shown in FIG. 4 includes an optional bearing ring 64.

The interior of pivot joint assembly 20 may also be sealed. An axial cap 66 is configured to prevent the ingress of foreign material into, and the egress of lubricant from, the pivot joint assembly 20. An additional sealing element 68 is compressed between the pivot joint assembly 20 and the bushing assembly 30. A zerk fitting 70 is disposed in axial cap 66, allowing grease to be applied into the interior of pivot joint assembly 20.

While the best modes and other embodiments for carrying out the claimed invention have been described in detail, those familiar with the art to which this invention relates will recognize various alternative designs and embodiments for practicing the invention within the scope of the appended claims.

The invention claimed is:

1. A steering mechanism comprising:
    a relay rod;
    an idler arm operatively attached to a first end of said relay rod;
    a pitman arm having a joint and a stud, wherein the stud is operatively attached to a second end of said relay rod substantially opposite said first end; and
    a bushing disposed within said second end of said relay rod, wherein said bushing is configured to allow displacement of said pitman arm relative to said relay rod, wherein said bushing further includes:
        an outer can;
        an inner metal member, wherein said inner metal member includes a tapered receptacle configured to mate with a corresponding tapered portion of said stud; and
        a resilient member disposed substantially between said outer can and said inner metal member, such that said resilient member, outer can, and inner metal member are substantially co-axial about said stud.

2. The steering mechanism of claim 1, wherein said resilient member includes a plurality of voids.

3. The steering mechanism of claim 2, wherein said inner metal member further includes:
    a first generally-cylindrical portion; and
    substantially-opposing first and second outer flats interrupting said first generally-cylindrical portion, wherein said first and second outer flats are spaced by a lower-flat distance smaller than the diameter of said first generally-cylindrical portion.

4. The steering mechanism of claim 3, wherein said first and second outer flats are substantially parallel to a turning direction which is generally parallel to said relay rod.

5. The steering mechanism of claim 4, wherein each of said plurality of voids are generally perpendicular to said turning direction.

6. The steering mechanism of claim 5, wherein said relay rod is constructed from multiple components, such that said relay rod further includes:
    an idler component on said first end of said relay rod,
    a bushing component on said second end of said relay rod; and
    a hollow shaft component connecting said idler component and said bushing component.

7. The steering mechanism of claim 6, wherein said lower-flat distance is less than approximately 95% of the diameter of said first generally-cylindrical portion.

8. The steering mechanism of claim 7, wherein each of said plurality of voids have a width of between approximately 1 mm to 2 mm.

9. The steering mechanism of claim 8, wherein said plurality of voids are tapered, such that an opening of said plurality of voids is larger than a base of said plurality of voids.

10. The steering mechanism of claim 9, wherein said resilient member has a shear thickness of approximately 10-15% of the outer diameter of said resilient member.

11. The steering mechanism of claim 10, wherein said inner metal member further includes:
    a second generally-cylindrical portion; and
    substantially-opposing third and fourth outer flats interrupting said second generally-cylindrical portion, wherein said third and fourth outer flats are spaced by an upper-flat distance smaller than the diameter of said second generally-cylindrical portion.

12. A relay rod bushing for attachment to a pitman arm via a stud and configured to allow displacement of the stud relative to the relay rod, comprising:
- an outer can;
- an inner metal member, wherein said inner metal member includes:
  - a tapered receptacle configured to mate with a corresponding tapered portion of the stud;
  - a first generally-cylindrical portion; and
  - substantially-opposing first and second outer flats interrupting said first generally-cylindrical portion, wherein said first and second outer flats are spaced by a lower-flat distance smaller than the diameter of said first generally-cylindrical portion; and
- a resilient member disposed substantially between said outer can and said inner metal member.

13. The bushing of claim 12, wherein said resilient member includes a plurality of voids.

14. The bushing of claim 13, wherein each of said plurality of voids are generally perpendicular to a turning direction which is generally parallel to the relay rod.

15. The bushing of claim 14, wherein said first and second outer flats are substantially parallel to said turning direction.

16. The steering mechanism of claim 15, wherein said plurality of voids are tapered, such that an opening of said plurality of voids is larger than a base of said plurality of voids.

17. The steering mechanism of claim 16, wherein said resilient member has a shear thickness of approximately 10-15% of the outer diameter of said resilient member.

18. The steering mechanism of claim 17, wherein said lower-flat distance is less than approximately 95% of the diameter of said first generally-cylindrical portion.

19. The steering mechanism of claim 18, wherein each of said plurality of voids have a width of between approximately 1 mm to 2 mm.

20. A steering mechanism comprising:
- a relay rod;
- an idler arm operatively attached to a first end of said relay rod;
- a pitman arm having a joint and a stud, wherein the stud is operatively attached to a second end of said relay rod substantially opposite said first end; and
- a bushing disposed within said second end of said relay rod, wherein said bushing is configured to allow displacement of said pitman arm relative to said relay rod, wherein said bushing further includes:
  - an outer can;
  - an inner metal member, wherein said inner metal member includes a tapered receptacle configured to mate with a corresponding tapered portion of said stud, wherein said inner metal member further includes:
    - a first generally-cylindrical portion;
    - substantially-opposing first and second outer flats interrupting said first generally-cylindrical portion, wherein said first and second outer flats are spaced by a lower-flat distance smaller than the diameter of said first generally-cylindrical portion;
    - a second generally-cylindrical portion; and
    - substantially-opposing third and fourth outer flats interrupting said second generally-cylindrical portion, wherein said third and fourth outer flats are spaced by an upper-flat distance smaller than the diameter of said second generally-cylindrical portion; and
  - a resilient member disposed substantially between said outer can and said inner metal member, such that said resilient member, outer can, and inner metal member are substantially co-axial about said stud, and wherein said resilient member includes a plurality of voids.

* * * * *